(12) United States Patent
Mukerjee et al.

(10) Patent No.: US 9,988,489 B2
(45) Date of Patent: *Jun. 5, 2018

(54) HIGH RECYCLE CONTENT POLYOLS FROM THERMOPLASTIC POLYESTERS AND LIGNIN OR TANNIN

(71) Applicant: Resinate Materials Group, Inc., Plymouth, MI (US)

(72) Inventors: Shakti Mukerjee, Canton, MI (US); Kevin Anthony Rogers, Farmington, MI (US); Matthew James Beatty, Ann Arbor, MI (US); Gary E. Spilman, Northville, MI (US)

(73) Assignee: Resinate Materials Group, Inc., Plymouth, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/663,881

(22) Filed: Jul. 31, 2017

(65) Prior Publication Data
US 2017/0327638 A1 Nov. 16, 2017

Related U.S. Application Data

(63) Continuation of application No. 15/266,247, filed on Sep. 15, 2016, which is a continuation of application No. 15/079,349, filed on Mar. 24, 2016, now Pat. No. 9,481,760, which is a continuation of application No. PCT/US2016/013549, filed on Jan. 15, 2016.

(60) Provisional application No. 62/106,148, filed on Jan. 21, 2015.

(51) Int. Cl.

| | |
|---|---|
| *C08G 18/32* | (2006.01) |
| *C08G 18/42* | (2006.01) |
| *C08G 18/64* | (2006.01) |
| *C08G 18/66* | (2006.01) |
| *C08G 18/73* | (2006.01) |
| *C08G 18/75* | (2006.01) |
| *C08G 63/133* | (2006.01) |
| *C08G 63/668* | (2006.01) |
| *C08G 63/676* | (2006.01) |
| *C08G 63/91* | (2006.01) |
| *C08J 11/24* | (2006.01) |
| *C09D 167/02* | (2006.01) |
| *C09D 167/03* | (2006.01) |
| *C09D 175/06* | (2006.01) |

(52) U.S. Cl.
CPC ....... *C08G 63/916* (2013.01); *C08G 18/3206* (2013.01); *C08G 18/4225* (2013.01); *C08G 18/6492* (2013.01); *C08G 18/664* (2013.01); *C08G 18/73* (2013.01); *C08G 18/755* (2013.01); *C08G 63/133* (2013.01); *C08G 63/668* (2013.01); *C08G 63/676* (2013.01); *C08G 63/914* (2013.01); *C08J 11/24* (2013.01); *C09D 167/02* (2013.01); *C09D 167/03* (2013.01); *C09D 175/06* (2013.01); *C08J 2367/02* (2013.01); *Y02P 20/582* (2015.11)

(58) Field of Classification Search
CPC ............ C08G 18/3206; C08G 18/4225; C08G 18/73; C08G 18/755; C08G 18/6492; C08G 63/916; C08G 63/676; C08G 63/914; C08G 63/668; C08G 63/133; C08G 18/664; C08J 2367/02; C08J 11/24; C09D 175/06; C09D 167/02; C09D 167/03; Y02P 20/582
See application file for complete search history.

(56) References Cited

U.S. PATENT DOCUMENTS

| | | |
|---|---|---|
| 2,793,220 A | 5/1957 | Barrett et al. |
| 3,519,581 A | 7/1970 | Moorer et al. |
| 3,647,759 A | 3/1972 | Walker |
| 3,658,638 A | 4/1972 | Ludwig et al. |
| 3,912,706 A | 10/1975 | Rachor et al. |
| 3,962,208 A | 6/1976 | Zeigerson et al. |
| 4,017,474 A | 4/1977 | Glasser et al. |
| 4,017,475 A | 4/1977 | Ludwig |
| 4,032,483 A | 6/1977 | Hartman |
| 4,222,818 A | 9/1980 | Gullichsen et al. |
| 4,371,469 A | 2/1983 | Foglia et al. |
| 4,411,949 A | 10/1983 | Snider et al. |

(Continued)

FOREIGN PATENT DOCUMENTS

| | | |
|---|---|---|
| CA | 104511 A | 4/1907 |
| GB | 737091 A | 9/1955 |

(Continued)

OTHER PUBLICATIONS

Paszun et al., Chemical Recycling of Poly(ethylene terephthalate), Ind. Eng. Chem. Res. 1997, 36, pp. 1373-1383.

(Continued)

*Primary Examiner* — Patrick D Niland
(74) *Attorney, Agent, or Firm* — Dilworth IP LLC

(57) ABSTRACT

Polyester polyols, processes for making them, and applications for the polyols are disclosed. In some aspects, the polyols comprise recurring units from a thermoplastic polyester or an aromatic polyacid source, a glycol, and a lignin, tannin, or mixture thereof. Optionally, the polyols incorporate recurring units of a hydrophobe. The polyols are made in one or multiple steps; in some aspects, the thermoplastic polyester or aromatic polyacid source and the glycol are reacted first, followed by reaction with the lignin, tannin, or mixture thereof. High-recycle-content polyols having desirable properties and attributes for formulating polyurethane products, including two-component polyurethane coatings, can be made. The polyols provide a sustainable alternative to bio- or petrochemical-based polyols.

9 Claims, No Drawings

(56) References Cited

U.S. PATENT DOCUMENTS

| | | |
|---|---|---|
| 4,701,477 A | 10/1987 | Altenberg et al. |
| 4,714,717 A | 12/1987 | Londrigan et al. |
| 4,803,255 A | 2/1989 | Pruett et al. |
| 4,851,457 A | 7/1989 | Kurple |
| 4,897,429 A | 1/1990 | Trowell et al. |
| 4,918,167 A | 4/1990 | Glasser et al. |
| 4,987,213 A | 1/1991 | Hirose et al. |
| 5,075,417 A | 12/1991 | Trowell et al. |
| 5,138,027 A | 8/1992 | Van Beek |
| 5,155,163 A | 10/1992 | Abeywardena et al. |
| 5,177,169 A | 1/1993 | Schroeder |
| 5,502,247 A | 3/1996 | Bartos et al. |
| 5,516,338 A | 5/1996 | Pai |
| 5,608,000 A | 3/1997 | Duan et al. |
| 5,730,837 A | 3/1998 | Black et al. |
| 5,763,526 A | 6/1998 | Harakawa et al. |
| 6,025,452 A | 2/2000 | Kurple |
| 6,172,204 B1 | 1/2001 | Sarkanen et al. |
| 6,229,054 B1 | 5/2001 | Dai et al. |
| 6,281,373 B1 | 8/2001 | Sato et al. |
| 6,339,125 B1 | 1/2002 | Bechara et al. |
| 6,395,808 B1 | 5/2002 | Nikkeshi et al. |
| 6,406,530 B1 | 6/2002 | Bengs et al. |
| 6,433,121 B1 | 8/2002 | Petrovic et al. |
| 6,624,258 B1 | 9/2003 | Nikkeshi |
| 6,630,601 B1 | 10/2003 | Inada et al. |
| 6,635,723 B1 | 10/2003 | Maier et al. |
| 6,642,350 B1 | 11/2003 | Asakawa et al. |
| 6,747,076 B2 | 6/2004 | Schneider et al. |
| 7,045,573 B2 | 5/2006 | Mayer et al. |
| 7,192,988 B2 | 3/2007 | Smith et al. |
| 7,342,068 B2 | 3/2008 | Klingenberg et al. |
| 7,465,791 B1 | 12/2008 | Hallberg et al. |
| 7,649,086 B2 | 1/2010 | Belanger et al. |
| 7,781,521 B2 | 8/2010 | Schneider et al. |
| 7,858,725 B2 | 12/2010 | Dai et al. |
| 7,994,268 B2 | 8/2011 | Dai et al. |
| 8,263,726 B2 | 9/2012 | Dai et al. |
| 8,598,297 B2 | 12/2013 | Bedri et al. |
| 8,664,352 B2 | 3/2014 | Abraham et al. |
| 9,481,760 B2 | 11/2016 | Mukerjee et al. |
| 2009/0131625 A1 | 5/2009 | Kurian et al. |
| 2009/0269378 A1 | 10/2009 | Hueffer et al. |
| 2009/0287007 A1 | 11/2009 | Abraham et al. |
| 2011/0065832 A1 | 3/2011 | Dai et al. |
| 2011/0065882 A1 | 3/2011 | Dai et al. |
| 2011/0065883 A1 | 3/2011 | Dai et al. |
| 2011/0065947 A1 | 3/2011 | Dai et al. |
| 2011/0118495 A1 | 5/2011 | Dai et al. |
| 2011/0313124 A1 | 12/2011 | Yalamanchili et al. |
| 2012/0136169 A1 | 5/2012 | Abraham et al. |
| 2012/0184701 A1 | 7/2012 | Kubo et al. |
| 2014/0099505 A1 | 4/2014 | Thunga et al. |
| 2015/0126716 A1 | 5/2015 | Kessler et al. |
| 2015/0344737 A1 | 12/2015 | Bode et al. |

FOREIGN PATENT DOCUMENTS

| | | |
|---|---|---|
| WO | 97/24362 A1 | 7/1997 |
| WO | 2000/075252 A1 | 12/2000 |
| WO | 2006/012344 A1 | 6/2004 |
| WO | 2009/058367 A1 | 5/2009 |
| WO | 2013/170236 A2 | 11/2013 |
| WO | 2014/075057 A1 | 5/2014 |
| WO | 2015/021541 A1 | 2/2015 |

OTHER PUBLICATIONS

Ton-That et al., "Biopolyols Containing Lignin for PU Applications," CPI Polyurethanes Technical Conference, Sep. 22-24, 2014, Dallas, TX.
W. Hoareau et al., Polym. Degrad. Stab. 86 (2004) 567.
S. Shelley, Chem. Eng., Jun. 2009, 16.
P. Mileo et al., Adv. Mater. Res. 123-125 (2010) 1143.
C. Li et al., Adv. Mater. Res. 150-151 (2011) 1167.
X. Luo et al., Mater. Sci. Forum 620-622 (2009) 241.
G. Tondi et al., Ind. Crops Prod. 29 (2009) 356.
F. Calvo-Flores et al., ChemSusChem 3 (2010) 1227.
D. Goring, Pure Appl. Chem. 5 (1962) 233.
M. Delmas, Appita (2009) 39.
C. Cateto, Ind. Eng. Chem. Res. 48 (2009) 2583.
J. Lindberg et al. in Lignin: Properties and Materials, ACS Symp. Ser. 397 (1989), Ch. 14, 190.
S. Hirose et al. in Lignin: Properties and Materials, ACS Symp. Ser. 397 (1989), Ch. 29, 382.
J. Bozell et al., PNNL-16983 (Oct. 2007) 1.
J. Zakzeski et al, ChemSusChem 5 (2012) 1602.
S. Tan et al., Green Chem. 11 (2009) 339.
C. Cateto et al., React. Funct. Polym. 71 (2011) 863.
Y. Jin et al., Bioresour. Technol. 102 (2011) 3581.
M. Alma, Polym. Mater.: New Res. (2005) Ch. 2, 37.
H. Nadji et al., Macromol. Mater. Eng. 290 (2005) 1009.
W. Glasser et al., Polym. Bull. 12 (1984) 1.
H. Militz et al., Wood Mater. Sci. Eng. 4 (2009) 23.
N. El Mansouri et al., Bioresources 6 (2011) 2647.
N. Smolarski, "High Value Opportunities for Lignin: Unlocking its Potential," Frost & Sullivan (2012) 1.
G. Mendis, J. Appl. Polym. Sci. 132 (2015) 41263.
Tran, P., J. Am. Oil Chem. Soc., 82 (2005) 653.
Ikladious, N., J. Elast. Plast. 32 (2000) 140.
Troev, K. et al., J. Appl. Polym. Sci. 90 (2003) 1148.
PCT International Search Report and Written Opinion dated Apr. 13, 2016 from corresponding Application No. PCT/US2016/013549, 12 pages.

HIGH RECYCLE CONTENT POLYOLS FROM THERMOPLASTIC POLYESTERS AND LIGNIN OR TANNIN

FIELD OF THE INVENTION

The invention relates to polyol compositions produced from thermoplastic polyesters and lignin or tannin. The polyols are useful for formulating polyurethanes and other condensation polymers.

BACKGROUND OF THE INVENTION

Aromatic polyester polyols are commonly used intermediates for the manufacture of polyurethane products, including flexible and rigid foams, polyisocyanurate foams, coatings, sealants, adhesives, and elastomers. The aromatic content of these polyols contributes to strength, stiffness, and thermal stability of the urethane product.

Commonly, the aromatic polyester polyol is made by condensing aromatic diacids, diesters, or anhydrides (e.g., terephthalic acid, dimethyl terephthalate) with glycols such as ethylene glycol, propylene glycol, diethylene glycol, or the like. These starting materials usually derive exclusively from petrochemical sources.

As companies increasingly seek to offer products with improved sustainability, the availability of intermediates produced from bio-renewable and/or recycled materials becomes more leveraging. However, there remains a need for these products to deliver equal or better performance than their traditional petroleum-based alternatives at a comparable price point.

Bio-renewable content alone can be misleading as an indicator of "green" chemistry. For example, when a food source such as corn is needed to provide the bio-renewable content, there are clear trade-offs between feeding people and providing them with performance-based chemical products. Additionally, the chemical or biochemical transformations needed to convert sugars or other bio-friendly feeds to useful chemical intermediates such as polyols can consume more natural resources and energy and can release more greenhouse gases and pollutants into the environment than their petro-based alternatives in the effort to achieve "green" status.

Waste thermoplastic polyesters, including waste polyethylene terephthalate (PET) streams (e.g., from plastic beverage containers), provide an abundant source of raw material for making new polymers. Usually, when PET is recycled, it is used to make new PET beverage bottles, PET fiber, or it is chemically transformed to produce polybutylene terephthalate (PBT). Other recycled raw materials are also available. For example, recycled propylene glycol is available from aircraft or RV deicing and other operations, and recycled ethylene glycol is available from spent vehicle coolants.

Urethane formulators demand polyols that meet required specifications for color, clarity, hydroxyl number, functionality, acid number, viscosity, and other properties. These specifications will vary and depend on the type of urethane application. For instance, rigid foams generally require polyols with higher hydroxyl numbers than the polyols used to make flexible foams.

Polyols suitable for use in making high-quality polyurethanes have proven difficult to manufacture from recycled materials, including recycled polyethylene terephthalate (rPET). Many references describe digestion of rPET with glycols (also called "glycolysis"), usually in the presence of a catalyst such as zinc, titanium, or tin. Digestion converts the polymer to a mixture of glycols and low-molecular-weight PET oligomers. Although such mixtures have desirably low viscosities, they often have high hydroxyl numbers or high levels of free glycols. Frequently, the target product is a purified bis(hydroxyalkyl) terephthalate (see, e.g., U.S. Pat. Nos. 6,630,601, 6,642,350, and 7,192,988) or terephthalic acid (see, e.g., U.S. Pat. No. 5,502,247). Some of the efforts to use glycolysis product mixtures for urethane manufacture are described in a review article by D. Paszun and T. Spychaj (*Ind. Enq. Chem. Res.* 36 (1997) 1373).

Most frequently, ethylene glycol is used as the glycol reactant for glycolysis. This is sensible because it minimizes the possible reaction products. Usually, the glycolysis is performed under conditions effective to generate bis(hydroxyethyl) terephthalate ("BHET"), although sometimes the goal is to recover pure terephthalic acid. When ethylene glycol is used as a reactant, the glycolysis product is typically a crystalline or waxy solid at room temperature. Such materials are less than ideal for use as polyol intermediates because they must be processed at elevated temperatures. Polyols are desirably free-flowing liquids at or close to room temperature.

Lignin is a principal component of vascular plants, contributing 20-30 wt. % to dry softwoods and hardwoods. Lignin is an amorphous, polyphenolic material produced from an enzyme-catalyzed polymerization of coniferyl alcohol, sinapyl alcohol, and p-coumaryl alcohol. Industrial lignin is a by-product of the pulp and paper industry. Two types, kraft lignin (also called "alkali lignin") and lignosulfonates, are available commercially. Organosolv lignins, a more soluble form of lignin, can be obtained by pulping wood with solvents such as alcohols or aqueous acetic acid, but organosolv lignins have not yet become widely available. Lignosulfonates have been used as water reducers for concrete and as dispersants for gypsum wallboard. Alkali lignins generally have lower molecular weight, narrower molecular weight distribution, and lower water solubility (except at higher pH) compared with lignosulfonates. Once sulfonated, however, alkali lignin is generally useful in a variety of dispersant applications. So far, organosolv lignins have had only limited practical utility.

Lignins have been incorporated into polyurethane foams and other products, typically by including the lignin as a filler or additive (see, e.g., Ton-That et al., "Biopolyols Containing Lignin for PU Applications," CPI Polyurethanes Technical Conference, Sep. 22-24, 2014, Dallas, Tex., and U.S. Pat. Nos. 3,519,581 and 4,987,213). Lignins have also been modified by reaction with maleic anhydride, propylene oxide, or other reactants to give polyetherester intermediates for polyurethanes (see, e.g., U.S. Pat. No. 4,017,474).

Tannins occur naturally in plant species and are another type of polyphenolic biomolecule. Most tannins derive from gallic acid, flavone, or phloroglucinol. Tannins have been suggested as heat stabilizers for thermoplastic polyesters (see U.S. Pat. No. 6,395,808).

Lignins and tannins have not been reacted with glycolized thermoplastic polymer intermediates to produce polyols useful for polyurethanes.

Improved polyols are needed. In particular, the urethane industry needs sustainable polyols based in substantial part on recycled polymers such as the practically unlimited supply of recycled polyethylene terephthalate. Polyols with high recycle content that satisfy the demanding color, clarity, viscosity, functionality, and hydroxyl content requirements of polyurethane formulators would be valuable.

SUMMARY OF THE INVENTION

The invention relates to polyester polyols, processes for making them, and applications for the polyols.

In one aspect, the polyol comprises recurring units from a digested thermoplastic polyester; a glycol; a lignin, a tannin, or a mixture thereof; and optionally, a hydrophobe. The molar ratio of glycol to thermoplastic polyester recurring units is at least 0.8. The amount of lignin, tannin, or mixture thereof incorporated into the polyol is within the range of 0.1 to 35 wt. %. The polyol has a hydroxyl number within the range of 25 to 800 mg KOH/g. The optional hydrophobe may be, for example, a dimer fatty acid, a natural oil or other triglyceride, or a bio-polyol.

In another aspect, the polyol comprises recurring units from an aromatic polyacid source, a glycol, and a lignin, a tannin, or a mixture thereof. The amount of lignin, tannin, or mixture thereof incorporated into the polyol is within the range of 0.1 to 35 wt. %. The polyol has a hydroxyl number within the range of 25 to 800 mg KOH/g.

In some inventive processes for making the polyester polyols, a thermoplastic polyester or an aromatic polyacid source is heated with a glycol to give a digested intermediate. The intermediate is then reacted with a lignin, a tannin, or a mixture thereof to give the polyol. The molar ratio of glycol to thermoplastic polyester or aromatic polyacid source is at least 0.8, the amount of lignin, tannin, or mixture thereof incorporated into the polyol is within the range of 0.1 to 35 wt. %, and the polyol has a hydroxyl number within the range of 25 to 800 mg KOH/g.

In other inventive processes, no digested intermediate is prepared; the thermoplastic polyester or aromatic polyacid source, the glycol, and the lignin, tannin, or mixture thereof are simply combined and reacted in a single process step.

We surprisingly found that high-recycle-content polyester polyols having desirable hydroxyl numbers, viscosities, functionalities, appearance, and other attributes for formulating polyurethane products can be made by reacting a thermoplastic polyester or aromatic polyacid source, a glycol, and a lignin, tannin, or mixture thereof. The lignin, tannin, or mixture thereof facilitates production of polyols from recycled thermoplastics. The polyols are valuable for formulating a variety of polyurethanes and related products—including polyurethane dispersions, flexible and rigid foams, coatings, adhesives, sealants, and elastomers—and they provide a sustainable alternative to bio- or petrochemical-based polyols.

DETAILED DESCRIPTION OF THE INVENTION

In one aspect, the polyol comprises recurring units from a digested thermoplastic polyester; a glycol; a lignin, tannin, or mixture thereof; and optionally, a hydrophobe.

Thermoplastic polyesters suitable for use are well known in the art. They are condensation polymers produced from the reaction of glycols and aromatic dicarboxylic acids or acid derivatives. Examples include polyethylene terephthalate (PET); polybutylene terephthalate (PBT); polytrimethylene terephthalate (PTT); glycol-modified polyethylene terephthalate (PETG); copolymers of terephthalic acid and 1,4-cyclohexanedimethanol (PCT); PCTA (an isophthalic acid-modified PCT); polyhydroxy alkanoates (e.g., polyhydroxybutyrate); copolymers of 2,2,4,4-tetramethyl-1,3-cyclobutanediol with isophthalic acid, terephthalic acid or orthophthalic derivatives; polyethylene furanoate; dihydroferulic acid polymers (e.g., poly(dihydroferulic acid) and poly(dihydroferulic acid-co-ferulic acid); see PCT Internat. Appl. No. WO 2014/075057, the teachings of which are incorporated herein by reference), and the like, and mixtures thereof. Further examples of polyester thermoplastics are described in *Modern Polyesters: Chemistry and Technology of Polyesters and Copolyesters*, J. Scheirs and T. Long, eds., Wiley Series in Polymer Science, 2003, John Wiley & Sons, Ltd. Hoboken, N.J. Other examples of thermoplastic polyesters may be found in Chapters 18-20 of *Handbook of Thermoplastics*, O. Olabisi, ed., 1997, Marcel Dekker, Inc. New York. Suitable thermoplastic polyesters include virgin polyesters, recycled polyesters, or mixtures thereof. In a preferred aspect, polyethylene terephthalate, especially recycled polyethylene terephthalate (rPET), virgin PET, and mixtures thereof, is used. For more examples of suitable thermoplastic polyesters, see U.S. Pat. Appl. Publ. No. 2009/0131625, the teachings of which are incorporated herein by reference.

Recycled polyethylene terephthalate suitable for use in making the inventive polyester polyols can come from a variety of sources. The most common source is the post-consumer waste stream of PET from plastic bottles or other containers. The rPET can be colorless or contain dyes (e.g., green, blue, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

In some aspects, the polyester polyol comprises recurring units from a digested thermoplastic polyester. "Digested" refers to a reaction product generated by reacting the thermoplastic polyester with one or more glycols, optionally in the presence of a catalyst, under conditions effective to at least partially depolymerize the thermoplastic polyester to produce oligomeric materials.

In some aspects, an aromatic polyacid source is used as an alternative to the thermoplastic polyester. By "aromatic polyacid source," a compound or mixture of compounds having at least one carbocyclic or heterocyclic aromatic ring and two or more carboxylic acid functional groups, which may be in the form of acids, esters, or anhydrides.

Suitable aromatic polyacid sources include phthalic acid, phthalic anhydride, dialkyl phthalates (e.g., dimethyl phthalate, diethyl phthalate, or the like), terephthalic acid, dialkyl terephthalates (e.g., dimethyl terephthalate), isophthalic acid, dialkyl isophthalates, DMT bottoms (as described, e.g. in U.S. Pat. Nos. 5,075,417; 4,897,429; 3,647,759; 4,411,949; 4,714,717; and 4,897,429, the teachings of which are incorporated herein by reference), trimellitic acid, trimellitic anhydride, trimethyl trimellitate, naphthalene dicarboxylic acids, pyromellitic acid, pyromellitic anhydride, 2,5-furandicarboxylic acid, dialkyl 2,5-furandicarboxylates, dialkyl naphthalene dicarboxylates, and mixtures thereof. Phthalic anhydride, isophthalic acid, and dimethyl terephthalate (and DMT bottoms) are readily available and are preferred aromatic polyacid sources. Suitable aromatic polyacid sources also include commercial aromatic polyester polyols, such as, for example Stepanpol® P2352, a polyol made from phthalic anhydride and diethylene glycol (product of Stepan Company).

Glycols suitable for use are well known. By "glycol," we mean a linear or branched, aliphatic or cycloaliphatic compound or mixture of compounds having two or more hydroxyl groups. Other functionalities, particularly ether or ester groups, may be present in the glycol. In preferred glycols, two of the hydroxyl groups are separated by from 2 to 10 carbons, preferably 2 to 5 carbons. Suitable glycols include, for example, ethylene glycol, propylene glycol, 1,3-propanediol, 1,2-butylene glycol, 1,3-butylene glycol, 1,4-butanediol, 2-methyl-1,3-propanediol, pentaerythritol, sorbitol, neopentyl glycol, glycerol, trimethylolpropane, 2,2,4,4-tetramethyl-1,3-cyclobutanediol, 3-methyl-1,5-pentanediol, 1,4-cyclohexane-dimethanol, 1,3-cyclohexanedimethanol, bisphenol A ethoxylates, diethylene glycol, dipropylene glycol, triethylene glycol, 1,6-hexanediol, tripropylene glycol, tetraethylene glycol, polyethylene glycols having a number average molecular weight up to about 400 g/mol, block or random copolymers of ethylene oxide and propylene oxide, and the like, and mixtures thereof. In some aspects, the glycol is selected from propylene glycol, 2-methyl-1,3-propanediol, 3-methyl-1,5-pentanediol, neopentyl glycol, diethylene glycol, polyethylene glycol having a number average molecular weight of about 200, and mixtures thereof. Propylene glycol is particularly preferred. In a preferred aspect, the glycol is a recycled glycol, especially recycled propylene glycol. Propylene glycol recovered from used deicing fluids is one example.

In some aspects, the polyester polyol comprises recurring units from a lignin, a tannin, or a mixture thereof. Suitable lignins include alkali lignins, organosolv lignins, and the like, and mixtures thereof. Organosolv lignins and their mixtures with alkali lignins are preferred. Alkali lignins are generated in the kraft process for paper pulping and are commercially available, for example, from MeadWestVaco. Research quantities of alkali lignins and organosolv lignins can be obtained from Sigma-Aldrich, for example. Larger quantities of alkali lignins are available from kraft plants, which normally burn the lignin for its fuel value. Larger quantities of organosolv lignins may be obtained, for example, from CIMV (France) or Lignol (Canada), which operate pilot units for producing organosolv lignins.

We surprisingly found that organosolv lignins are particularly well-suited for making polyols because they readily react with digested intermediates or with mixtures of thermoplastic polyesters and glycols to provide the inventive polyol compositions. When the more readily available alkali lignins are used, the polyols can have an undesirable level of particulates (see Example M and Comparative Example N, below).

The amount of lignin present in the inventive polyols can vary over a wide range. Generally, the polyols will comprise 0.1 to 35 wt. %, preferably 1 to 30 wt. %, more preferably 2 to 25 wt. %, of the lignin or its mixture with a tannin.

Tannins suitable for use are the polyphenolic materials that occur in plant species. Suitable tannins derive from gallic acid, flavone, or phloroglucinol. Tannins suitable for use have been described in U.S. Pat. Nos. 5,516,338; 6,395,808; 6,624,258; and U.S. Publ. No. 2009/0269378, the teachings of which are incorporated herein by reference. The amount of tannin present in the inventive polyols can vary over a wide range. Generally, the polyols will comprise 0.1 to 35 wt. %, preferably 1 to 30 wt. %, more preferably 2 to 25 wt. %, of the tannin or its mixture with a lignin.

Optional Hydrophobes

In some aspects, the polyester polyol may incorporate recurring units from one or more hydrophobes. When a hydrophobe is included, it is preferably included in an amount within the range of 0.1 to 1.0 moles of hydrophobe per mole of thermoplastic polyester. In other aspects, the hydrophobe is present in an amount within the range of 0.15 to 0.8 moles of hydrophobe per mole of thermoplastic polyester.

Suitable hydrophobes are well known. Examples include dimer fatty acids, oleic acid, ricinoleic acid, tung oil, corn oil, canola oil, soybean oil, sunflower oil, triglycerides or alkyl carboxylate esters having saturated or unsaturated $C_6$-$C_{36}$ fatty acid units, castor oil, alkoxylated castor oil, saturated or unsaturated $C_6$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or fatty acids, and mixtures thereof. The hydrophobes are well-suited to be reacted with glycol-digested thermoplastic polyesters and hydroxy-functional ketal esters or amides. The resulting products can be non-viscous, pourable liquids that usually have good transparency, low particulates, and little or no tendency to phase separate.

Dimer fatty acids are suitable hydrophobes. Dimer fatty acids are made by dimerizing unsaturated fatty acids (e.g., oleic acid, linoleic acid, linolenic acid, ricinoleic acid) in the presence of a catalyst, such as a bentonite or montmorillonite clay. Commercially available dimer fatty acids are usually mixtures of products in which the dimerized product predominates. Some commercial dimer acids are made by dimerizing tall oil fatty acids. Dimer fatty acids frequently have 36 carbons and two carboxylic acid groups. They may be saturated or unsaturated. They may also be hydrogenated to remove unsaturation. In a preferred aspect, the dimer fatty acid comprises dimerized oleic acid, trimerized oleic acid, dimerized linoleic acid, trimerized linolelic acid, dimerized linolenic acid, trimerized linolenic acid, or mixtures thereof. Suitable dimer fatty acids include Pripol™ dimer fatty acids (products of Croda) such as Pripol™ 1006, 1009, 1010, 1012, 1013, 1017, 1022, 1025, 1027, 1029, 1036, and 1098; Unidyme™ dimer acids (products of Arizona Chemical) such as Unidyme 10, 14, 18, 22, 35, M15, and M35; dimer acids available from Emery Oleochemicals, and FloraDyme™ dimer acids from Florachem Corporation. Methods for synthesizing dimer fatty acids suitable for use are also known. Fatty acids having at least one carbon-carbon double bond are dimerized in the presence of a catalyst such as a montmorillonite, kaolinite, hectorite, or attapulgite clay (see, e.g., U.S. Pat. Nos. 2,793,220, 4,371,469, 5,138,027, and 6,281,373, the teachings of which are incorporated herein by reference; see also WO 2000/075252 and CA 104511).

Oleic acid is a suitable hydrophobe. Oleic acid is ubiquitous in nature as a fatty acid and is readily available from saponification of animal and vegetable fats and oils.

Ricinoleic acid (12-hydroxy-9-cis-octadecenoic acid) can be used as the hydrophobe. Castor oil contains 90% or more of ricinoleic acid residues, and is a convenient and primary source of the acid.

Tung oil, also called "China wood oil," is also suitable for use as the hydrophobe. Tung oil is a triglyceride. The principal fatty acid residues (about 82%) are from alpha-eleostearic acid, a $C_{18}$ fatty acid with 9-cis, 11-trans, 13-trans unsaturation. The other fatty acid residues are from linoleic acid (8.5%), palmitic acid (5.5%), and oleic acid (4%). Consequently, tung oil has ester (glyceride) and olefin functionalities, and compared with other oils, it is highly unsaturated.

Other natural oils such as corn oil, canola oil, soybean oil, sunflower oil, and the like, are suitable hydrophobes. Also suitable are triglycerides or alkyl carboxylate esters having saturated or unsaturated $C_6$-$C_{36}$ fatty acid units.

Castor oil and alkoxylated castor oils are also suitable as hydrophobes. Castor oils ethoxylated with various proportions of ethylene oxide, for instance 5 to 100 moles of EO per mole of castor oil, are commercially available. Ethoxylated castor oils have ester (glyceride), olefin, and primary hydroxyl functionalities. Examples include Toximul® 8241, Toximul® 8242, and Toximul® 8244, products of Stepan Company, and the Etocas™ series of ethoxylated castor oils from Croda. Ethoxylated castor oils can also be synthesized using well-known processes by reacting the oil with ethylene oxide in the presence of an alkoxide, Lewis acid, double metal cyanide complex, or other suitable ethoxylation catalyst.

Saturated or unsaturated $C_6$-$C_{18}$ dicarboxylic acids or diols are suitable for use as hydrophobes. Examples include azelaic acid, nonenedioic acid, sebacic acid, decenedioic acid, dodecanedioic acid, dodecenedioic acid, tetradecanedioic acid, tetradecenedioic acid, hexadecanedioic acid, hexadecenedioic acid, octadecanedioic acid, octadecenedioic acid, and the like, and mixtures thereof. Dicarboxylic acids are generally widely available from commercial sources.

Cardanol-based products can also be used as the hydrophobe. Cardanol, the main constituent of cashew nutshell oil, is an alkylated phenol having a linear $C_{15}$ unsaturated alkyl chain. By "cardanol-based products," we mean to include cardanol and products derived from cardanol. Such products may include alkoxylated cardanols, including the hydroxyalkylated compositions described in U.S. Pat. No. 6,229,054, the teachings of which are incorporated herein by reference. Also suitable are "cardanol dimers," which can be made by joining two cardanol groups using a siloxane linker. In some aspects, Mannich chemistry is used to introduce amine functionality as an attachment to the phenolic rings of the cardanol dimers. Other functionalities, such as epoxy groups, can be introduced if desired. Suitable cardanol-based products, including cardanol dimers, are disclosed in U.S. Pat. Nos. 7,858,725; 7,994,268; 8,263,726; U.S. Pat. Appl. Publ. Nos. 2011/0118495; 2011/0065947; 2011/0065883; 2011/0065882; and 2011/0065832, the teachings of which are incorporated herein by reference.

Recycled cooking oils are also suitable hydrophobes. The cooking oils, which contain vegetable oil mixtures, are collected from restaurants or commercial food preparation facilities. We surprisingly found that such cooking oils can be used successfully as the hydrophobe component for making polyester polyols having acceptable properties and very high recycle contents. The product may be dark, even after carbon treatment, but its properties are generally consistent with requirements for acceptable polyols.

Branched or linear $C_6$-$C_{36}$ fatty alcohols are suitable hydrophobes. For instance, isostearyl alcohol, a commonly used fatty alcohol available as an article of commerce, is suitable for use. When isostearyl alcohol is used as the hydrophobe, it may be desirable to use a polyol having a hydroxyl functionality greater than 2, e.g., glycerin, to boost the overall average hydroxyl functionality to be within the range of 1.8 to 2.7.

Hydroxy-functional materials derived from epoxidized, ozonized, or hydroformylated fatty esters or fatty acids, also commonly known as "bio-polyols" or "natural oil polyols" are another category of suitable hydrophobes. These products can be made from fatty esters (including natural oils) or fatty acids in several steps. Some products include a step to epoxidize carbon-carbon double bonds in the fatty ester or fatty acid, followed by a ring-opening step. In other products, unsaturation in the fatty ester or fatty acid is hydroformylated and then hydrogenated to introduce the hydroxyl functionality (see, e.g., D. Babb et al., *Polym. Preprints* 48 (2007) 855, PCT Internat. Appl. WO 2006/012344, and U.S. Pat. No. 8,598,297, the teachings of which are incorporated herein by reference). Polyols made by hydrolysis or alcoholysis of epoxidized soybean oil are among the suitable bio-polyols. BiOH® polyols supplied by Cargill (e.g., BiOH® X-0002) and Agrol® polyols from BioBased Technologies are also suitable. The bio-polyol can also be generated "in situ" from a reaction between the glycol and an epoxidized fatty ester or an epoxidized fatty acid (such as epoxidized soybean oil, epoxidized methyl oleate, epoxidized oleic acid, or epoxidized methyl soyate). Suitable bio-polyols include polyols derived from ozonized fatty esters or ozonized fatty acids, such as mixtures obtained by ozonolysis of a natural oil in the presence of a glycol, as is described by P. Tran et al., *J. Am. Oil Chem. Soc.* 82 (2005) 653. For more examples of suitable bio-polyols, see U.S. Pat. Nos. 6,433,121; 8,664,352, U.S. Publ. Nos. 2012/0136169, 2011/0313124, and 2009/0287007, and PCT Appl. No. WO2009/058367, the teachings of which are incorporated herein by reference.

Processes for Making Polyester Polyols and Polyol Attributes

The invention includes processes for making the polyester polyols. In one aspect, the process comprises a first step of heating a thermoplastic polyester or an aromatic polyacid source with a glycol to give a digested intermediate. The intermediate is then reacted with a lignin, a tannin, or a mixture thereof to give the polyol. In this aspect, the molar ratio of glycol to thermoplastic polyester recurring units is at least 0.8, the amount of lignin, tannin, or mixture thereof incorporated into the polyol is within the range of 0.1 to 35 wt. %, and the polyol has a hydroxyl number within the range of 25 to 800 mg KOH/g.

When a thermoplastic polyester is used, the digested intermediate can be a mixture of glycol reactant, glycol(s) generated from the thermoplastic polyester, terephthalate oligomers, and other glycolysis products. For example, when PET or rPET is the thermoplastic polyester, the digested intermediate can include a mixture of glycol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140). Heating is advantageously performed at temperatures within the range of 80° C. to 260° C., preferably 100° C. to 250° C., more preferably 130° C. to 240° C., and most preferably 160° C. to 230° C.

In one aspect, when the thermoplastic polyester is polyethylene terephthalate, the digested intermediate comprises glycols and a terephthalate component. The terephthalate component preferably comprises, by gel permeation chromatography using ultraviolet detection, 45 to 70 wt. % of bis(hydroxyalkyl)terephthalates. In a preferred aspect, the terephthalate component further comprises 20 to 40 wt. % of terephthalate dimers. In another preferred aspect, the terephthalate component of the digested intermediate comprises 45 to 65 wt. % of bis(hydroxyalkyl)terephthalates, 20 to 35 wt. % of terephthalate dimers, and 5 to 15 wt. % of terephthalate trimers. In another preferred aspect, the terephthalate component comprises 50 to 60 wt. % of bis(hydroxyalkyl)terephthalates, 25 to 30 wt. % of terephthalate dimers, and 8 to 12 wt. % of terephthalate trimers.

Catalysts suitable for making the digested intermediate are well known (see, e.g., K. Troev et al., *J. Appl. Polym. Sci.* 90 (2003) 1148). In particular, suitable catalysts comprise titanium, zinc, antimony, germanium, zirconium, manganese, tin, or other metals. Specific examples include titanium alkoxides (e.g., tetrabutyl titanate or tetraisopropyl titanate), titanium(IV) phosphate, zirconium alkoxides, zinc acetate, lead acetate, cobalt acetate, manganese(II) acetate, antimony trioxide, germanium oxide, butyl stannoic acid, di-n-butyl-oxo-stannane, di-n-butyltin dilaurate, or the like, and mixtures thereof. Catalysts that do not significantly promote isocyanate reaction chemistries are preferred. As is discussed in more detail below, catalysts comprising titanium, particularly titanium alkoxides, are especially preferred. The amount of catalyst used is typically in the range of 0.005 to 5 wt. %, preferably 0.01 to 1 wt. %, more preferably 0.02 to 0.7 wt. %, based on the total amount of polyol being prepared.

Usually, the digestion reaction is performed by heating the thermoplastic polyester or aromatic polyacid source, the glycol(s), and any catalyst at least until the mixture liquefies and particles of the thermoplastic polyester or aromatic polyacid source are no longer apparent. Reaction times range from about 30 minutes to about 16 hours, more typically 1 to 10 hours, even more typically 3 to 8 hours, and will depend on the reaction temperature, source and nature of the thermoplastic polyester or aromatic polyester source, the particular glycol reactant used, mixing rate, desired degree of depolymerization, and other factors that are within the skilled person's discretion.

The molar ratio of glycol to thermoplastic polyester or aromatic polyester source is at least 0.8, preferably 0.8 to 6.0, more preferably 1.5 to 4.5. When the glycol to thermoplastic polyester (or aromatic polyester source) molar ratio is below 0.8, the polyester polyol may be a solid or may be too viscous to be practical for use as a polyol. On the other hand, when the glycol/thermoplastic polyester (or aromatic polyester source) molar ratio is greater than about 6, the hydroxyl number of the polyester polyol may tend to exceed the practical upper limit of about 800 mg KOH/g.

When a digested intermediate is prepared, it is reacted in a second step with a lignin, tannin, or mixture thereof (and any optional hydrophobe) to give the polyester polyol. The reaction between the digested intermediate and the lignin, tannin, or mixture thereof is performed under conditions effective to promote a condensation reaction between the digested intermediate and the lignin, tannin, or mixture thereof.

Reactions between the digested intermediate and the lignin, tannin, or mixture thereof (and any optional hydrophobe) are preferably performed by heating at temperatures within the range of 80° C. to 260° C., preferably 90° C. to 230° C., more preferably 100° C. to 220° C., and most preferably 110° C. to 210° C. Any water, alcohol, amine generated in this reaction is advantageously removed from the reaction mixture as it forms. On a lab scale, it is convenient to use a Dean-Stark trap or similar apparatus to remove such volatile materials, but other means will be more practical on a larger scale. Continuous processes for volatiles removal, such as vacuum stripping, wiped-film evaporation, sparging with dry air or nitrogen, and the like, may be desirable. The reaction may continue until a pre-determined amount of water and/or other volatile by-products have been collected or a target acid number and/or hydroxyl number is reached for the product.

In some aspects, the amount of lignin, tannin, or mixture thereof incorporated into the polyester polyol is within the range of 0.1 to 35 wt. %, 1.0 to 30 wt. %, or 2 to 25 wt. %. When less than 0.1 wt. % of the lignin, tannin, or mixture thereof is used, there may be too little benefit from including it. When more than 35 wt. % of the lignin, tannin, or mixture thereof is used, the formulation may become unworkable or there may be little or no additional performance benefit.

The polyol may incorporate one or more anhydrides, diesters, or dicarboxylic acids outside the $C_9$-$C_{18}$ range. Suitable dicarboxylic acids include, for example, glutaric acid, adipic acid, succinic acid, cyclohexane dicarboxylic acids, maleic acid, fumaric acid, itaconic acid, phthalic acid, 1,5-furandicarboxylic acid, dimer or trimer fatty acids, isophthalic acid, and anhydrides thereof (e.g., maleic anhydride, phthalic anhydride, itaconic anhydride, and the like). Mixtures of dicarboxylic acids can be used, including, e.g., the commercially available mixture of dibasic acids known as "DBA." A typical DBA composition might contain 51-61 wt. % glutaric acid, 18-28 wt. % succinic acid, and 15-25 wt. % adipic acid.

In another aspect, the polyester polyol is made in a single step by reacting the thermoplastic polyester or aromatic polyacid source, the glycol, and the lignin, tannin, or mixture thereof (and any optional hydrophobe) under conditions effective to produce the polyol. As with polyols made using the two-step process, the molar ratio of glycol to thermoplastic polyester or aromatic polyacid source is at least 0.8, the amount of lignin, tannin, or mixture thereof incorporated into the polyol is within the range of 0.1 to 35 wt. %, and the resulting polyol has a hydroxyl number within the range of 25 to 800 mg KOH/g. When the single-step process is used, it may be preferred to utilize a condensation system that returns glycols to the reaction vessel while allowing removal of water, alcohols, or other volatile by-products, as removal of too much glycol may produce cloudy or opaque polyols.

The inventive polyester polyols have hydroxyl numbers within the range of 25 to 800 mg KOH/g, preferably 35 to 500 mg KOH/g, and more preferably 40 to 400 mg KOH/g. Hydroxyl number can be measured by any accepted method for such a determination, including, e.g., ASTM E-222 ("Standard Test Methods for Hydroxyl Groups Using Acetic Anhydride Acetylation").

In some aspects, the inventive polyols may have average hydroxyl functionalities (i.e., the average number of —OH groups per molecule) within the range of 1.8 to 2.7, preferably 2.0 to 2.5, more preferably 2.0 to 2.2.

In preferred aspects, the inventive polyols are flowable liquids under ambient conditions. Preferably, the polyols have viscosities measured at 25° C. less than 30,000 cP, more preferably less than 20,000 cP, most preferably less than 10,000 cP. A preferred range for the polyol viscosity is 300 to 5,000 cP at 25° C., more preferably 500 to 3,000 cP. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

The polyols preferably have low acid numbers. Urethane manufacturers will often require that a polyol have an acid number below a particular specification. Low acid numbers can be ensured by driving reactions by removal of water from the reaction mixture to the desired level of completion. Preferably, the polyols have an acid number less than 30 mg KOH/g, more preferably less than 10 mg KOH/g, and most preferably less than 5 mg KOH/g. Acid numbers can be adjusted if necessary for a particular application with an acid scavenger such as, for example, an epoxide derivative, and this treatment can be performed by the manufacturer, distributor, or end user.

An advantage of the polyester polyols is their reduced reliance on petrochemical sources for raw material. Preferably, the polyols include greater than 10 wt. %, more preferably greater than 25 wt. %, most preferably greater than 40 wt. % of recycle content. A preferred range for the recycle content is 25 to 100 wt. %. By "recycle content," we mean the combined amounts of post-consumer and post-industrial recycled materials as a percentage of all of the reactants used. Recycled thermoplastic polyester (e.g., rPET) and recycled glycols are included in this amount. Propylene glycol, ethylene glycol, and diethylene glycol are available as recovered or recycled materials. For instance, propylene glycol is used in deicing fluids, and after use, it can be recovered, purified, and reused. Certain hydrophobes, such as recycled cooking oil, may also be a source of the recycle content.

In some aspects, the polyols will also have bio-renewable content as a result of the presence of a lignin, tannin, or mixture thereof. By "bio-renewable content," we mean the proportion of readily renewable materials from biological sources compared with the total mass of the reactants. Bio-renewable materials include, for example, plant-derived natural oils and the fatty acid components of the oils. Most of the optional hydrophobes described herein are "bio-renewable." In some aspects, the polyester polyols will have bio-renewable contents greater than 10 wt. %, preferably greater than 25 wt. %, more preferably greater than 40 wt. %.

In some aspects, the polyols will have substantial "green content." By "green content," we mean the sum of the recycle and bio-renewable contents. In some aspects, the polyester polyols will have green contents greater than 20 wt. %, preferably greater than 50 wt. %, more preferably greater than 80 wt. %, and most preferably greater than 90 wt. %.

Although performance in the ultimate end use is paramount, urethane manufacturers like to purchase polyols that have an appearance of quality. When other considerations are equal, a transparent (or nearly transparent) polyol may appear to be of higher quality and easier to process than an opaque one. ("Dispersion polyols" or "polymer polyols," which are common components of the load-bearing, high-resiliency urethane foams used in automotive seating or furniture applications, are a notable exception; they are supposed to appear opaque.) Unlike known polyols that are made by reacting thermoplastic polyester digestion products with dicarboxylic acids such as succinic acid or phthalic anhydride, which are often opaque, the inventive polyols are frequently transparent or nearly so.

Yet another desirable polyol attribute is the absence of settling, particularly upon prolonged storage. When settling is substantial, the polyol might have to be filtered or otherwise treated to remove the solids content; this is preferably avoided. Preferred inventive polyols exhibit no settling or only a slight degree of settling, and more preferred polyols exhibit no evidence of settling.

Products from the Polyester Polyols

The inventive polyester polyols can be used to formulate a wide variety of polyurethane products. By adjusting the proportion of a lignin, tannin, or mixture thereof and any optional hydrophobe, a desired degree of polyol hydrophobicity can be "dialed in." The ability to control hydrophobicity is particularly valuable in the coatings industry. The polyols can be used alone or in combination with other polyols to produce cellular, microcellular, and non-cellular materials including flexible foams, rigid foams (including polyisocyanurate foams), polyurethane dispersions, coatings (including one- or two-component polyurethanes), adhesives, sealants, and elastomers. The resulting polyurethanes are potentially useful for automotive and transportation applications, building and construction products, marine products, packaging foam, flexible slabstock foam, carpet backing, appliance insulation, cast elastomers and moldings, footwear, biomedical devices, and other applications.

Curable Coatings

Further, the inventive polyester polyols may be derivatized to form mono-, di- and polyacrylates via esterification or transesterification with acrylic acid or methacrylic acid-derived raw materials. Thus, in one aspect, the invention relates to a curable resin comprising a reaction product of an acrylate or methacrylate source and an inventive polyol. Examples of (meth)acrylation raw materials suitable for forming (meth)acrylate derivatives of the inventive polyester polyols include acryloyl chloride, methacryloyl chloride, methacrylic acid, acrylic acid, methyl acrylate, methyl methacrylate, and the like, or mixtures thereof. Such (meth)acrylate-derivatized inventive polyester polyols are useful for radiation or UV-cure coating formulations or applications. Prepolymers of the inventive polyester polyols may be derivatized to form urethane (meth)acrylates via reaction with hydroxyethyl (meth)acrylate. The resulting urethane acrylates may also be used in radiation or UV-cure coating formulations or applications.

Polyurethane Dispersions

In a particular aspect, the invention relates to aqueous polyurethane dispersions made from the inventive polyester polyols. The polyols are readily formulated into aqueous polyurethane dispersions having a desirable balance of properties, including high solids, low viscosities, and a low tendency to settle. Numerous ways to formulate aqueous polyurethane dispersions are known and suitable for use. Preferably, the polyurethane dispersion is made by emulsifying an isocyanate-terminated prepolymer in water with the aid of an emulsifying agent. Water, a water-soluble polyamine chain extender, or a combination thereof may be used to react with the emulsified prepolymer. The prepolymer is preferably made by reacting an inventive polyester polyol, a hydroxy-functional emulsifier, one or more auxiliary polyols, and one or more polyisocyanates. The aqueous polyurethane dispersions are preferably used to formulate water-borne coatings, adhesives, sealants, elastomers, and similar urethane products, and they are particularly valuable for reducing reliance on solvents. For instance, the dispersions can be used to formulate low- or zero-VOC compositions.

Polyisocyanates suitable for use in making the prepolymers are well known; they include aromatic, aliphatic, and cycloaliphatic polyisocyanates. Examples include toluene diisocyanates (TDIs), MDIs, polymeric MDIs, naphthalene diisocyanates (NDIs), hydrogenated MDIs, trimethyl- or tetramethylhexamethylene diisocyanates (TMDIs), hexamethylene diisocyanate (HDI), isophorone diisocyanates (IPDIs), cyclohexane diisocyanates (CHDIs), xylylene diisocyanates (XDI), hydrogenated XDIs, and the like. Aliphatic diisocyanates, such as hexamethylene diisocyanate and isophorone diisocyanates are particularly preferred.

Auxiliary polyols suitable for use are also well known. They include polyether polyols, aliphatic polyester polyols, aromatic polyester polyols, polycarbonate polyols, glycols, and the like. Preferred auxiliary polyols have average hydroxyl functionalities within the range of 2 to 6, preferably 2 to 3, and number average molecular weights within the range of 500 to 10,000, preferably 1,000 to 8,000. Preferred polyester polyols are condensation products of dicarboxylic acids and diols or triols (e.g., ethylene glycol, propylene glycol, 2-methyl-1,3-propanediol, 3-methyl-1,5-pentanediol, 1,4-butanediol, neopentyl glycol, glycerin, trimethylolpropane, 1,4-cyclohexanedimethanol, bisphenol A ethoxylates), especially diols. The dicarboxylic acids can be aliphatic (e.g., glutaric, adipic, succinic) or aromatic (e.g., phthalic), preferably aliphatic.

A hydroxy-functional emulsifier is also used to make the polyurethane dispersions. The role of this component is to impart water-dispersibility to the prepolymer, usually upon its combination with water and a neutralizing agent, such as an acid or base reactant. Thus, in one aspect, the hydroxy-functional emulsifier is an acid-functional diol such as dimethylolpropionic acid (DMPA) or dimethylolbutanoic acid (DMBA). The acid functionality in the resulting prepolymer allows for neutralization with an amine or other basic reactant to generate a water-dispersible urethane. The hydroxy-functional emulsifier can also be an amine, such as N-methyldiethanolamine. Neutralization of the resulting prepolymer with an acidic reagent renders it water dispersible. In other aspects, the hydroxy-functional emulsifier is nonionic, e.g., a polyethylene glycol monomethyl ether. In another aspect, the hydroxy-functional emulsifier may be a mono- or diol-functionalized poly(ethylene oxide), such as for example Ymer™ N120 dispersing monomer (product of Perstorp). Additionally, non-reactive, so-called "external emulsifiers," such as the triethanolamine salt of dodecyl-benzene sulfonic acid, may be included in the aqueous phase to assist in the emulsification and stabilization of the prepolymer and resulting polyurethane dispersion.

In certain aspects, a chain terminator may be used to control the molecular weight of polyurethane polymer contained within the aqueous polyurethane dispersion. Monofunctional compounds, such as those containing hydroxyl, amino, and thio groups that have a single active hydrogen-containing group, are suitable chain terminators. Examples include alcohols, amines, thiols, and the like, especially primary and secondary aliphatic amines.

Chain extenders can also be included in making the polyurethane dispersion. In some aspects, the chain extender is added in an amount sufficient to react 5 to 105 mole % of free NCO groups present. Suitable chain extenders contain at least two functional groups that are capable of reacting with isocyanates, e.g., hydroxyl, thio, or amino groups in any combination. Suitable chain extenders include, for example, diols (ethylene glycol, propylene glycol, diethylene glycol, neopentyl glycol, 1,4-butanediol, 2-methyl-1,3-propanediol, 3-methyl-1,5-pentanediol, 1,4-cyclohexanedimethanol, and the like), di- and polyamines (ethylenediamine, diethylenetriamine, Jeffamine® T-403, Jeffamine® D-230, Jeffamine® ED-2001, Jeffamine® ED-600, Jeffamine® ED-900, 1,6-hexamethylenediamine, butylenediamine, hydrazine, piperazine, N-hydroxyethyl ethylenediamine) alkanolamines (ethanolamine, diethanolamine, N-methyl diethanolamine, and the like), dithiols, and the like. Diol chain extenders are preferably added during the preparation of the prepolymer, and prior to emulsification in water, while amine chain extenders are preferably added after emulsification in water.

In a typical example, the polyester polyol, an acid-functional diol (DMPA), and auxiliary polyols (polyethylene glycol 200 and a polyester polyol made from 3-methyl-1,5-pentanediol and adipic acid) are combined and reacted with a mixture of aliphatic diisocyanates (hexamethylene diisocyanate and isophorone diisocyanate) in the presence of a tin catalyst (dibutyltin dilaurate) or a bismuth catalyst (such as bismuth dioctanoate) and a solvent (acetone). The resulting prepolymer is then dispersed in a mixture of water, triethanolamine (neutralizing agent), and a silicone defoamer. The expected product is an aqueous polyurethane dispersion having high solids content, low viscosity, and desirable settling properties.

For more examples of suitable approaches for preparing aqueous polyurethane dispersions, see U.S. Pat. Nos. 5,155,163; 5,608,000; 5,763,526; 6,339,125; 6,635,723, 7,045,573; and 7,342,068, the teachings of which are incorporated herein by reference.

The following examples merely illustrate the invention; the skilled person will recognize many variations that are within the spirit of the invention and scope of the claims.

"Recycle content" is the proportion of post-consumer and post-industrial recycled materials compared with the mass of all reactants. Materials having recycle content in the examples: rPET, propylene glycol.

"Bio-renewable content" is the proportion of readily renewable materials from biological sources compared with the mass of all reactants. Materials having bio-renewable content in the examples: alkali lignin, organosolv lignin, dimer fatty acid.

"Green content" is the sum of the recycle and bio-renewable contents.

Petro-based materials used in the examples: succinic acid.

Hydroxyl numbers and acid numbers are determined by standard methods (ASTM E-222 and ASTM D3339, respectively).

Viscosities are measured at 25° C. using a Brookfield DV-III Ultra rheometer with spindle #31 at 25%, 50%, and 75% torque.

Preparation of Lignin-Modified rPET Polyols: General Procedure

A reactor equipped with an overhead mixer, condenser, heating mantle, thermocouple, and nitrogen inlet is charged with titanium(IV) butoxide (500-1000 ppm), recycled polyethylene terephthalate pellets, and one or more glycols (propylene glycol or its mixture with neopentyl glycol, see Table 1 for amounts). The mixture is heated and stirred until the reactor contents reach 180° C. The mixture is heated until no particles of recycled PET remain (about 4 h). When the digestion reaction is considered complete, the mixture is cooled to about 100° C. Lignin (usually organosolv lignin) in an amount from 2 to 25 wt. % based on the amount of charged reactants is then added (see Table 1 for amount used), the mixing rate is increased to 200 rpm, and the mixture is heated for 10-24 h at 180° C. to 200° C. In some examples, a hydrophobe such as dimer fatty acid or corn oil is also included. In some examples, lignin is reacted with the digested intermediate followed by reaction with the hydrophobe. In certain comparative examples, the hydrophobe is reacted with the digested intermediate first, and the lignin is reacted later. Any water generated in the condensation reaction is removed. When the reaction is considered complete, the polyol product is allowed to cool to 100° C. and is then decanted from the reactor and filtered through cheesecloth.

Two-Component Polyurethane Formulations

The polyester polyol (13.8 g, 0.096 eq.), 2-methyl-1,3-propanediol (0.71 g, 0.016 eq.), and ethylene glycol (1.12 g, 0.055 eq.) are combined in a beaker at room temperature. Hexamethylene diisocyanate (8.82 g, 0.105 eq.) and isophorone diisocyanate (4.99 g, 0.045 eq.) are then added. The mixture is diluted to 50 wt. % with 2-butanone and mechanically stirred until a homogeneous mixture results. Dibutyltin dilaurate (0.050 wt. %.) is added. After mixing for about 5 minutes (and a 10° C. exotherm), a bead of the reacting mixture is applied to one side of each of five aluminum panels (4"×6"). The beads of solvent-borne polyurethane are drawn down using a #50 R.D. Specialties bar to a wet film thickness of 4.5 mils. The panels dry in a hood at ambient temperature for at least one hour. They are then heated to 110° C. for 1.5-2 h to complete the cure. The films are tested as described further below.

Testing Methods for 2K Polyurethane Coatings:

Dry film thickness is determined using a PosiTector 6000 (Defelsko Corporation) dry film thickness gauge. Konig hardness is measured using ISO 1522 using a TQC pendulum hardness tester (Model SPO500). The following ASTM test methods are used: pencil scratch hardness: ASTM D3363; flexibility: ASTM D522; adhesion: ASTM D3359; stain testing: ASTM D1308; viscosity: ASTM D562; polyurethane solids content: ASTM D1582; impact properties: ASTM D 5420-04.

Lignin Polyol Results:

Table 1 summarizes results of synthesizing polyols using varying amounts of organosolv lignin and different procedures.

Polyol A is made by digesting recycled PET with a mixture of propylene glycol (PG) and neopentyl glycol (NPG) until the hydroxyl number reaches about 390 mg KOH/g. Polyol B is made similarly but includes 2 wt. % of organosolv lignin in the reaction mixture. When no hydrophobe is included (as here), the lignin reacts well and produces a polyol that is free of particulates.

Polyol C is made by digesting rPET with PG, then reacting the resulting digested intermediate with lignin (2 wt. %), followed by a reaction with dimer fatty acid (a hydrophobe). The resulting polyol incorporates the lignin and is free of particulates. Polyol D is made similarly, except that the level of lignin is raised by more than an order of magnitude to 25 wt. %. Again, lignin is incorporated well and the product is free of particulates. Polyol E is a comparative example. In this case, rPET is reacted with PG, and the digested intermediate is first reacted with dimer fatty acid, followed by a reaction with lignin (25 wt. %). The lignin is not incorporated as well with the hydrophobic polyol, as is evident from the presence of particulates in Polyol E. Consequently, the order of reaction makes a difference in producing a desirable polyol.

Polyol F is formulated from rPET and PG, but targets a higher molecular weight intermediate compared with Polyol C. The digested intermediate reacts with lignin (10 wt. %), followed by a reaction with dimer fatty acid. The lignin is well incorporated as shown by the absence of particulates. Polyol G is similar but reverses the order, with dimer fatty acid being reacted first, followed by lignin (10 wt. %). In this case, the lignin is not as well incorporated as evidenced by the presence of particulates.

Polyol H is made by reacting rPET with a mixture of PG and NPG. This is used as a control for later experiments. Polyols I, J, K, and L are made similarly but the digested intermediate is further reacted with lignin (0.5, 2.0, 5.0, and 10.0 wt. %, respectively).

Polyol M is made by reacting Stepanpol® P2352, a commercially available aromatic polyester polyol, with organosolv lignin (10 wt. %). Polyol N is made similarly except that alkali lignin (10 wt. %) is used. As shown in Table 1, reaction with the organosolv lignin gives a product free of particulates, while reaction with the alkali lignin does not.

Polyol O is made by reacting rPET with PG, then with lignin (10 wt. %), then with corn oil (a hydrophobe, 36.8 wt. %) to give a particulate-free polyol. Polyol P is a comparative example in which the digested intermediate from rPET and PG is reacted first with corn oil (51.6 wt. %) followed by reaction with lignin (10 wt. %). In the latter case, the polyol contains particulates, indicating that the lignin is not as well incorporated into the hydrophobic polyol.

Polyol Q is provided to show that alkali lignin can be incorporated to provide a particulate-free polyol when a minor proportion of an organosolv lignin is also used.

Two-Component Polyurethane Coating Results:

Tables 2 and 3 summarize the results of testing two-component polyurethane coatings made from the inventive polyester polyols and some comparative examples. Generally, the inventive polyols provide coatings with good hardness, flexibility, scratch resistance, stain resistance, MEK resistance, and direct and indirect impact properties.

Examples 1 and 2 show that incorporation of as little as 2 wt. % lignin provides a slight increase in hardness and a dramatic increase in MEK resistance in the case of a polyester polyol made from rPET, PG, and NPG that does not include a hydrophobe.

Example 3 shows that good hardness, stain resistance, and MEK resistance can be obtained in a 2K coating when as little as 2 wt. % lignin is included in the formulation.

Example 4 shows that a polyol incorporating 25 wt. % of lignin can be used to make a 2K coating, and that hardness and MEK resistance of the coating are boosted by the increased lignin content. Comparative Example 5 shows that a less-desirable film flecked with particles is obtained when Polyol E is used to make the coating. Additionally, the hardness and MEK resistance of this coating are not as high when the lignin is not well incorporated into the polyester polyol.

Example 5 and Comparative Example 6 illustrate that the improvement in properties is not as dramatic when the polyol has higher molecular weight, as is the case with Polyols F and G.

TABLE 1

Lignin Polyols

| Polyol | Description | particulates? | rPET, % | Lignin, % | PG, % | NPG, % | DFA, % | SA, % | Recycle % | Acid # | OH # | Mn, g/mol |
|---|---|---|---|---|---|---|---|---|---|---|---|---|
| A | rPET, PG/NPG, no lignin | N/A | 68.0 | — | 13.5 | 18.5 | — | — | 81.5 | 1.5 | 389 | 288 |
| B | rPET, PG/NPG, then 2% lignin | no | 66.7 | 2.0 | 13.2 | 18.1 | — | — | 81.9 | 1.4 | 368 | 305 |

TABLE 1-continued

Lignin Polyols

| Polyol | Description | particulates? | rPET, % | Lignin, % | PG, % | NPG, % | DFA, % | SA, % | Recycle % | Acid # | OH # | Mn, g/mol |
|---|---|---|---|---|---|---|---|---|---|---|---|---|
| C | rPET, PG, 2% lignin, then DFA | no | 28.2 | 2.0 | 31.3 | — | 38.5 | — | 61.5 | 1.5 | 355 | 316 |
| D | rPET, PG, 25% lignin, then DFA | no | 21.6 | 25.0 | 23.9 | — | 29.5 | — | 70.5 | 32 | 292 | 384 |
| E* | rPET, PG, DFA, then 25% lignin | yes | 21.6 | 25.0 | 23.9 | — | 29.5 | — | 70.5 | 3.8 | 281 | 399 |
| F | rPET, PG, 10% lignin, then DFA | no | 26.7 | 10.0 | 18.7 | — | 33.7 | 10.8 | 55.4 | 3.6 | 47 | 2368 |
| G* | rPET, PG, DFA, then 10% lignin | yes | 27.0 | 10.0 | 18.0 | — | 34.1 | 10.9 | 55.0 | 1.9 | 103 | 1093 |
| H* | rPET, PG/NPG, no lignin | N/A | 69.9 | — | 12.7 | 17.4 | — | — | 82.6 | 0.6 | 358 | 313 |
| I | rPET, PG/NPG then 0.5% lignin | no | 69.6 | 0.5 | 12.6 | 17.3 | — | — | 82.7 | 1.3 | 335 | 335 |
| J | rPET, PG/NPG, then 2% lignin | no | 68.6 | 2.0 | 12.4 | 17.0 | — | — | 83.0 | 1.8 | 320 | 351 |
| K | rPET, PG/NPG, then 5% lignin | no | 66.5 | 5.0 | 12.0 | 16.5 | — | — | 83.5 | 3.0 | 315 | 357 |
| L | rPET, PG/NPG, then 10% lignin | no | 63.0 | 10.0 | 11.4 | 15.6 | — | — | 84.4 | 6.3 | 300 | 374 |
| M | Stepanpol® P2352 (90%) + organosolv lignin (10%) | no | — | — | — | — | — | — | 10.0 | 4.2 | 221 | 507 |
| N* | Stepanpol® P2352 (90%) + alkali lignin (10%) | yes | — | — | — | — | — | — | 10.0 | 5.5 | 167 | 672 |
| O | rPET, PG, 10% lignin, then corn oil (36.8%) | no | 35.6 | 10.0 | 17.6 | — | — | — | 63.2 | 2.6 | 183 | 613 |
| P* | rPET, PG, corn oil (51.6%), then 10% lignin | yes | 21.4 | 10.0 | 17.0 | — | — | — | 48.4 | 1.8 | 220 | 511 |
| Q | rPET, PG/NPG, then 1% alkali lignin and 4% organosolv lignin | no | 65.5 | 5.0 | 12.1 | 16.5 | — | — | 82.5 | — | — | — |

*Comparative example. "Lignin" refers to organosolv lignin unless otherwise indicated. Acid # and OH# are in mg KOH/g.
PG = propylene glycol,
NPG = neopentyl glycol,
DFA = dimer fatty acid,
SA = succinic acid.
All % are by weight. All polyols have functionality = 2.0.

TABLE 2

Two-Component Polyurethane Coatings

| Example | 1 | 2 | 3 | 4 | C5 | 6 | C7 |
|---|---|---|---|---|---|---|---|
| Polyol | A | B | C | D | E | F | G |
| MW | 288 | 305 | 316 | 384 | 399 | 2367 | 1093 |
| OH # | 389 | 368 | 355 | 292 | 281 | 47 | 103 |
| Film description | clear, firm | lt. beige, some delamination | light beige, firm | light beige, firm | dark brown, firm, particles | light beige, firm | light brown, particles |
| Konig oscillations | 122 | 129 | 86 | 122 | 101 | 13 | 10 |
| Konig seconds | 172 | 182 | 120 | 172 | 142 | 18 | 14 |
| Pencil hardness | 10 | 10 | 7 | 9 | 7 | 9 | 10 |
| Adhesion | 5.0 | 5.0 | 5.0 | 5.0 | 5.0 | 4.0 | 4.7 |
| Madrel bend | 1/8" | 1/8" | 1/8" | fails | 1/8" | fails | 1/8" |
| Windex spot, 1 h, and 1 h recovery | 5 | 5 | 5 | 5 | 5 | 5 | 5 |
| 50% EtOH spot, 1 h, and 1 h recovery | 5 | 5 | 5 | 5 | 5 | 5 | 5 |
| vinegar spot, 1 h, and 1 h recovery | 5 | 5 | 5 | 5 | 5 | 5 | 5 |
| water spot, 24 h, and 1 h recovery | 5 | 5 | 5 | 5 | 5 | 5 | 5 |
| MEK double rubs | 25 | 105 | 63 | 83 | 28 | 33 | 25 |
| Direct impact | — | — | — | >160 | — | >160 | — |
| Indirect impact | — | — | — | >160 | — | >160 | — |

TABLE 3

Two-Component Polyurethane Coatings

| Example | control | 8 | 9 | 10 | 11 | C12* | C13* | C14* | C15* |
|---|---|---|---|---|---|---|---|---|---|
| Polyol | H | I | J | K | L | H | H | H | H |
| MW | 313 | 335 | 351 | 357 | 374 | 313 | 313 | 313 | 313 |
| OH # | 358 | 335 | 321 | 315 | 300 | 358 | 358 | 358 | 358 |

TABLE 3-continued

Two-Component Polyurethane Coatings

| Example | control | 8 | 9 | 10 | 11 | C12* | C13* | C14* | C15* |
|---|---|---|---|---|---|---|---|---|---|
| Lignin added (wt. %) | — | — | — | — | — | 0.5 | 2.0 | 5.0 | 10.0 |
| % lignin in polyol | — | 0.5 | 2.0 | 5.0 | 10.0 | — | — | — | — |
| Film description | lt. beige, firm | clear, glossy, firm | lt. beige, glossy, firm | dk. beige, glossy, firm | brown, glossy, firm | yellow, glossy, firm | med.beige, glossy, firm | beige, glossy, firm | dk. beige, grainy, firm |
| Konig oscillations | 117 | 91 | 88 | 128 | 133 | 137 | 132 | 143 | 142 |
| Konig seconds | 164 | 127 | 124 | 180 | 187 | 192 | 186 | 201 | 200 |
| Pencil hardness | 9 | 7 | 10.5 | 9.5 | 8.5 | 9.5 | 10 | 10 | 10 |
| Adhesion | 4.0 | 4.3 | 0.7 | 0 | 0.3 | 3.3 | 5.0 | 5.0 | 5.0 |
| Mandrel bend | fails | ⅛" | ⅛" | ⅛" | ⅛" | ⅛" | ⅛" | ⅛" | fails |
| Windex spot, 1 h, | 5 | 5 | 5 | 5 | 5 | 5 | 5 | 5 | 5 |
| and 1 h recovery | 5 | 5 | 5 | 5 | 5 | 5 | 5 | 5 | 5 |
| 50% EtOH spot, | 5 | 5 | 5 | 5 | 5 | 5 | 5 | 5 | 5 |
| 1 h, and 1 h recovery | 5 | 5 | 5 | 5 | 5 | 5 | 5 | 5 | 5 |
| vinegar spot, 1 h, | 5 | 5 | 5 | 5 | 5 | 5 | 5 | 5 | 5 |
| and 1 h recovery | 5 | 5 | 5 | 5 | 5 | 5 | 5 | 5 | 5 |
| water spot, 24 h, | 5 | 5 | 5 | 5 | 5 | 5 | 5 | 5 | 5 |
| and 1 h recovery | 5 | 5 | 5 | 5 | 5 | 5 | 5 | 5 | 5 |
| MEK double rubs | 48 | 50 | 80 | 105 | 113 | 70 | 130 | 130 | 68 |
| Direct impact | 10 | 30 | 20 | 20 | 40 | 20 | 60 | 80 | 100 |
| Indirect impact | 0 | 0 | 10 | 0 | 20 | 0 | 20 | 40 | 50 |

*Comparative Example

In Examples 8-11 (Table 3), the polyols have organosolv lignin reacted into the polyol at 0.5, 2.0, 5.0, and 10.0 wt. % lignin, respectively, for Polyols I, J, K, and L. In each case, a coating with a favorable balance of properties is made when compared with the control (Polyol H).

In Comparative Examples 12-15, lignin is added directly into a two-component polyurethane formulation at 0.5, 2.0, 5.0, and 10.0 wt. % levels along with Polyol H. Although these coatings also look reasonably good, it is apparent that the coatings become hard with even 0.5 wt. % lignin added and that the hardness is independent of the amount of lignin added. Additionally, the MEK resistance decreases as the amount of lignin included reaches 10 wt. %.

In contrast, incorporation of lignin into the polyol provides more control over the degree of hardness in the two-component polyurethane coating. The formulator can control hardness by adjusting the amount of lignin used to prepare the polyester polyol. Moreover, the MEK resistance continues to improve with increasing amounts of lignin reacted into the polyol, even with 10 wt. % lignin. Consequently, there are substantial advantages to reacting lignin into the polyester polyol.

The preceding examples are meant only as illustrations; the following claims define the inventive subject matter.

We claim:

1. A liquid polyester polyol comprising recurring units from:
   (a) a digested thermoplastic polyester;
   (b) a glycol; and
   (c) a lignin, a tannin, or a mixture thereof;
   wherein the molar ratio of glycol to thermoplastic polyester recurring units is at least 0.8, the amount of lignin, tannin, or mixture thereof incorporated into the polyol is within the range of 0.1 to 35 wt. %, and the polyol has a hydroxyl number measurable by ASTM E-222 within the range of 35 to 500 mg KOH/g, an average hydroxyl functionality within the range of 1.8 to 2.7, and a viscosity at 25° C. less than 10,000 cP.

2. The polyol of claim 1 wherein the thermoplastic polyester is selected from the group consisting of polyethylene terephthalate; polybutylene terephthalate; polytrimethylene terephthalate; glycol-modified polyethylene terephthalate; copolymers of terephthalic acid with 1,4-cyclohexanedimethanol; isophthalic acid-modified copolymers of terephthalic acid with 1,4-cyclohexanedimethanol; copolymers of 2,2,4,4-tetramethyl-1,3-cyclobutanediol with isophthalic acid derivatives; copolymers of 2,2,4,4-tetramethyl-1,3-cyclobutanediol with terephthalic acid derivatives; copolymers of 2,2,4,4-tetramethyl-1,3-cyclobutanediol with orthophthalic acid derivatives; polyhydroxyalkanoates; polyethylene furanoate; dihydroferulic acid polymers; and mixtures thereof.

3. The polyol of claim 1 wherein the thermoplastic polyester is selected from the group consisting of virgin PET, recycled PET, and mixtures thereof.

4. The polyol of claim 1 wherein the glycol is selected from the group consisting of ethylene glycol, propylene glycol, 1,3-propanediol, 1,2-butylene glycol, 1,3-butylene glycol, 1,4-butanediol, 2,2,4,4-tetramethyl-1,3-cyclobutanediol, 2-methyl-1,3-propanediol, 1,6-hexanediol, pentaerythritol, sorbitol, neopentyl glycol, glycerol, trimethylolpropane, 3-methyl-1,5-pentanediol, 1,4-cyclohexanedimethanol, 1,3-cyclohexanedimethanol, bisphenol A ethoxylates, diethylene glycol, tetraethylene glycol, dipropylene glycol, triethylene glycol, tripropylene glycol, polyethylene glycols having a number average molecular weight up to about 400 g/mol, block or random copolymers of ethylene oxide and propylene oxide, and mixtures thereof.

5. The polyol of claim 1 wherein the molar ratio of glycol to thermoplastic polyester is within the range of 1.5 to 4.5.

6. The polyol of claim 1 wherein the lignin is an organosolv lignin, an alkali lignin, or a mixture thereof.

7. The polyol of claim 1 wherein the amount of lignin, tannin, or mixture thereof incorporated into the polyol is within the range of 2 to 25 wt. %.

8. The polyol of claim 1 having a combined recycle and bio-renewable content as defined herein greater than 80 wt. %.

9. The polyol of claim 1 having an average hydroxyl functionality within the range of 1.8 to 2.2.

* * * * *